United States Patent
Luo et al.

(10) Patent No.: US 7,471,832 B2
(45) Date of Patent: Dec. 30, 2008

(54) METHOD AND APPARATUS FOR ARBITRATING OUTPUTS FROM MULTIPLE PATTERN RECOGNITION CLASSIFIERS

(75) Inventors: Yun Luo, Livonia, MI (US); Jon K. Wallace, Redford, MI (US); Farid Khairallah, Farmington Hills, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 849 days.

(21) Appl. No.: 10/785,278

(22) Filed: Feb. 24, 2004

(65) Prior Publication Data

US 2005/0185845 A1 Aug. 25, 2005

(51) Int. Cl.
 *G06K 9/62* (2006.01)
(52) U.S. Cl. .................. 382/224; 280/735; 348/148; 382/103; 382/104; 382/159; 382/190; 701/45; 701/49
(58) Field of Classification Search .......... 382/103, 382/190, 224, 228, 284, 104, 159; 701/45, 701/47, 49; 280/732, 735; 348/148, 228
See application file for complete search history.

(56) References Cited

U.S. PATENT DOCUMENTS

| | | | |
|---|---|---|---|
| 5,086,480 A | 2/1992 | Sexton | |
| 5,330,226 A | 7/1994 | Gentry et al. | |
| 5,528,698 A * | 6/1996 | Kamei et al. | 382/100 |
| 6,141,432 A | 10/2000 | Breed et al. | |
| 6,144,366 A | 11/2000 | Numazaki et al. | |
| 6,324,453 B1 | 11/2001 | Breed et al. | |
| 6,393,133 B1 | 5/2002 | Breed et al. | |
| 6,459,974 B1 | 10/2002 | Baloch et al. | |
| 6,775,606 B1 * | 8/2004 | Ertl et al. | 701/49 |
| 6,801,662 B1 * | 10/2004 | Owechko et al. | 701/45 |
| 7,031,530 B2 * | 4/2006 | Driggs et al. | 382/228 |
| 7,111,869 B2 * | 9/2006 | David et al. | 280/735 |
| 7,233,692 B2 * | 6/2007 | Li et al. | 382/159 |
| 2002/0050924 A1 | 5/2002 | Mahbub | |
| 2002/0149184 A1 | 10/2002 | Ertl et al. | |
| 2003/0036835 A1 | 2/2003 | Breed et al. | |
| 2003/0121704 A1 * | 7/2003 | Breed et al. | 177/144 |
| 2003/0125855 A1 | 7/2003 | Breed et al. | |

(Continued)

OTHER PUBLICATIONS

Phetkaew et al., "Reordering Adaptive Directed Acyclic Graphs: An Improved Algorithm for Multiclass Support Vector Machines", *Journal of Advanced Computational Intelligence and Intelligent Informatics*, vol. 7, No. 3, 2003, XP002386455.

(Continued)

*Primary Examiner*—Gregory M Desire
(74) *Attorney, Agent, or Firm*—Tarolli, Sundheim, Covell & Tummino LLP

(57) ABSTRACT

A system (400) for classifying an input image into one of a plurality of output classes includes a plurality of pattern recognition classifiers (420, 422, 424). Each of the plurality of pattern recognition classifiers determines a candidate output class and at least one rejected output class for the input image from an associated subset of the plurality of output classes. Each classifier generates a confidence value associated with the classifier based on the determination. An arbitrator (430) selects a classifier having the best associated confidence value and eliminates the at least one rejected class determined at the selected classifier from consideration as the associated class for the input image.

16 Claims, 4 Drawing Sheets

U.S. PATENT DOCUMENTS

| | | | |
|---|---|---|---|
| 2003/0204384 | A1 | 10/2003 | Owechko et al. |
| 2003/0209893 | A1 | 11/2003 | Breed et al. |
| 2004/0085448 | A1* | 5/2004 | Goto et al. ............... 348/148 |
| 2005/0175235 | A1* | 8/2005 | Luo et al. ............... 382/159 |
| 2005/0175243 | A1* | 8/2005 | Luo et al. ............... 382/224 |
| 2005/0179239 | A1* | 8/2005 | Farmer et al. ............ 280/735 |
| 2005/0185845 | A1* | 8/2005 | Luo et al. ............... 382/224 |
| 2005/0185846 | A1* | 8/2005 | Luo et al. ............... 382/224 |
| 2007/0055428 | A1* | 3/2007 | Kong et al. ............... 701/45 |

OTHER PUBLICATIONS

Lachiche et al., "Improving Accuracy and Cost of Two-Class and Multi-Class Probabilistic Classifiers Using ROC Curves", *International Conference on Machine Learning,* 2003, XP002386456.

Pratt, "Digital Image Processing", 2001, Wiley Interscience, New York, XP002386466.

Tax et al., "Using Two-Class Classifiers for Multiclass Classification", *IEEE Comput. Soc.*, US, vol. 2, Aug. 11, 2002 pp. 124-127, XP010613836.

Fürnkranz. "Pairwise Classification as an Ensemble Technique", *In: European Conference on Machine Learning (ECML).*, 2002, XP002386457.

Cortes et al., "Support-Vector Networks", *Machine Learning,* vol. 20, 1995, pp. 273-297, XP002386458.

Otsu. "A Threshold Selection Method from Gray-Level Histograms", *IEEE Transactions on Systems, Man and Cybernetics,* vol. 9, No. 1, 1979, pp. 62-66, XP002386459.

U.S. Wallace et al. U.S. Appl. No. 10/447,248, filed May 28, 2003 entitled "Method and Apparatus for Determining an Occupant's Head Location in an Actuatable Occupant Restraining System,".

U.S. Lu et al. Patent Application filed Feb. 5, 2004 entitled "Method and Apparatus for Selectively Extracting Training Data for a Pattern Recognition Classifier Using Grid Generation,".

U.S. Lu et al Patent Application filed Feb. 5, 2004 entitled Method and Apparatus for Selectively Extracting Training Data for a Pattern Recognition Classifier Using Grid Generation.

* cited by examiner

US 7,471,832 B2

METHOD AND APPARATUS FOR ARBITRATING OUTPUTS FROM MULTIPLE PATTERN RECOGNITION CLASSIFIERS

TECHNICAL FIELD

The present invention is directed generally to pattern recognition classifiers and is particularly directed to a method and apparatus for arbitrating among the outputs of multiple pattern recognition classifiers. The present invention is particularly useful in occupant restraint systems for object and/or occupant classification.

BACKGROUND OF THE INVENTION

Actuatable occupant restraining systems having an inflatable air bag in vehicles are known in the art. Such systems that are controlled in response to whether the seat is occupied, an object on the seat is animate or inanimate, a rearward facing child seat present on the seat, and/or in response to the occupant's position, weight, size, etc., are referred to as smart restraining systems. One example of a smart actuatable restraining system is disclosed in U.S. Pat. No. 5,330,226.

Pattern recognition systems can be loosely defined as systems capable of distinguishing between classes of real world stimuli according to a plurality of distinguishing characteristics, or features, associated with the classes. A number of pattern recognition systems are known in the art, including various neural network classifiers, self-organizing maps, and Bayesian classification models. A common type of pattern recognition system is the support vector machine, described in modern form by Vladimir Vapnik [C. Cortes and V. Vapnik, "Support Vector Networks," *Machine Learning*, Vol. 20, pp. 273-97, 1995].

Support vector machines are intelligent systems that generate appropriate separating functions for a plurality of output classes from a set of training data. The separating functions divide an N-dimensional feature space into portions associated with the respective output classes, where each dimension is defined by a feature-used for classification. Once the separators have been established, future input to the system can be classified according to its location in feature space (e.g., its value for N features) relative to the separators. In its simplest form, a support vector machine distinguishes between two output classes, a "positive" class and a "negative" class, with the feature space segmented by the separators into regions representing the two alternatives.

SUMMARY OF THE INVENTION

In accordance with one exemplary embodiment of the present invention, a system is provided for classifying an input image into one of a plurality of output classes. The system includes a plurality of pattern recognition classifiers. Each of the plurality of pattern recognition classifiers determines a candidate output class and at least one rejected output class for the input image from an associated subset of the plurality of output classes. Each classifier generates a confidence value associated with the classifier based on the determination. An arbitrator selects a classifier having the best associated confidence value and eliminates the at least one rejected class determined at the selected classifier from consideration as the associated class for the input image.

In accordance with another exemplary embodiment of the present invention, a system is provided for classifying image data associated with a vehicle occupant safety system into an associated one of a plurality of output classes. The system includes a vision system that images a vehicle interior to provide an input image. The system further includes a plurality of pattern recognition classifiers, each of the plurality of pattern recognition classifiers having associated first and second output classes from the plurality of output classes. Each classifier is operative to select one of the first and second output classes as a candidate output class for the input image and the other of the first and second output classes as a rejected output class. Each classifier generates a confidence value associated with the classifier based on the selection. An arbitrator selects a classifier having the best associated confidence value from a classifier set initially comprising the plurality of classifiers and determines the rejected class associated with the selected classifier. Each classifier within the classifier set having the rejected class as one of its associated first and second output classes is removed.

In accordance with yet another exemplary embodiment of the present invention, a method is provided for classifying an input image into an associated one of a plurality of output classes. A candidate output class, at least one rejected output class, and an associated confidence value are determined from a set of associated output classes at each of a plurality of classifiers. A classifier is selected from the plurality of classifiers having a best confidence value. The rejected classes from the selected classifier are eliminated from consideration as the associated class for the input image.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
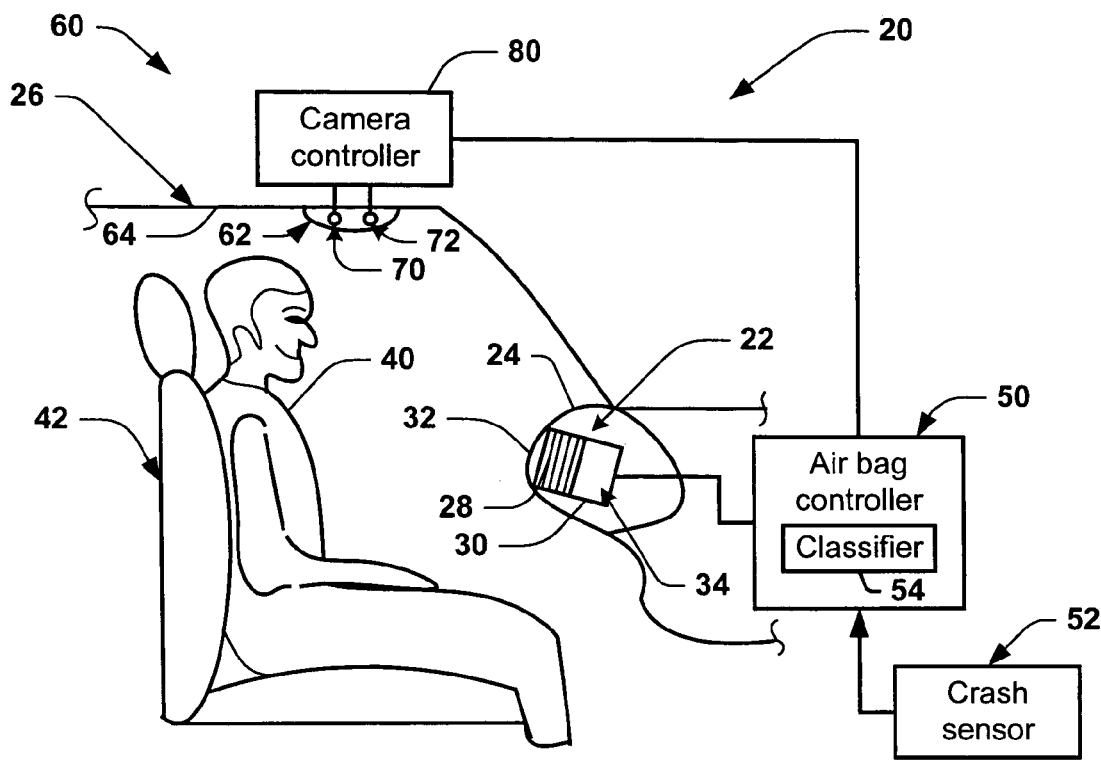
FIG. 1 is a schematic illustration of an actuatable restraining system in accordance with an exemplary embodiment of the present invention.

Referring to FIG. 1, an exemplary embodiment of an actuatable occupant restraint system 20, in accordance with the present invention, includes an air bag assembly 22 mounted in an opening of a dashboard or instrument panel 24 of a vehicle 26. The air bag assembly 22 includes an air bag 28 folded and stored within the interior of an air bag housing 30. A cover 32 covers the stored air bag and is adapted to open easily upon inflation of the air bag 28.

The air bag assembly 22 further includes a gas control portion 34 that is operatively coupled to the air bag 28. The gas control portion 34 may include a plurality of gas sources (not shown) and vent valves (not shown) for, when individually controlled, controlling the air bag inflation, e.g., timing, gas flow, bag profile as a function of time, gas pressure, etc. Once inflated, the air bag 28 may help protect an occupant 40, such as a vehicle passenger, sitting on a vehicle seat 42. Although the embodiment of FIG. 1 is described with regard to a vehicle passenger seat, it is applicable to a vehicle driver seat and back seats and their associated actuatable restraining systems. The present invention is also applicable to the control of side actuatable restraining devices and to actuatable devices deployable in response to rollover events.

An air bag controller 50 is operatively connected to the air bag assembly 22 to control the gas control portion 34 and, in turn, inflation of the air bag 28. The air bag controller 50 can take any of several forms such as a microcomputer, discrete circuitry, an application-specific-integrated-circuit ("ASIC"), etc. The controller 50 is further connected to a vehicle crash sensor 52, such as one or more vehicle crash accelerometers. The controller monitors the output signal(s) from the crash sensor 52 and, in accordance with an air bag control algorithm using a deployment control algorithm, determines if a deployment event is occurring, i.e., one for which it may be desirable to deploy the air bag 28. There are several known deployment control algorithms responsive to deployment event signal(s) that may be used as part of the present invention. Once the controller 50 determines that a deployment event is occurring using a selected crash analysis algorithm, for example, and if certain other occupant characteristic conditions are satisfied, the controller 50 controls inflation of the air bag 28 using the gas control portion 34, e.g., timing, gas flow rate, gas pressure, bag profile as a function of time, etc.

The air bag restraining system 20, in accordance with the present invention, further includes a stereo-vision assembly 60. The stereo-vision assembly 60 includes stereo-cameras 62 preferably mounted to the headliner 64 of the vehicle 26. The stereo-vision assembly 60 includes a first camera 70 and a second camera 72, both connected to a camera controller 80. In accordance with one exemplary embodiment of the present invention, the cameras 70, 72 are spaced apart by approximately 35 millimeters ("mm"), although other spacing can be used. The cameras 70, 72 are positioned in parallel with the front-to-rear axis of the vehicle, although other orientations are possible.

The camera controller 80 can take any of several forms such as a microcomputer, discrete circuitry, ASIC, etc. The camera controller 80 is connected to the air bag controller 50 and provides a signal to the air bag controller 50 to provide data relating to various image characteristics of the occupant seating area, which can range from an empty seat, an object on the seat, a human occupant, etc. Herein, image data of the seating area is generally referred to as occupant data, which includes all animate and inanimate objects that might occupy the occupant seating area. The air bag control algorithm associated with the controller 50 can be made sensitive to the provided image data. For example, if the provided image data indicates that the occupant 40 is an object, such as a shopping bag, and not a human being, actuating the air bag during a crash event serves no purpose. Accordingly, the air bag controller 50 can include a pattern recognition classifier network 54 operative to distinguish between a plurality of occupant classes based on the image data provided by the camera controller 80 that can then, in turn, be used to control the air bag.

Figure 2:
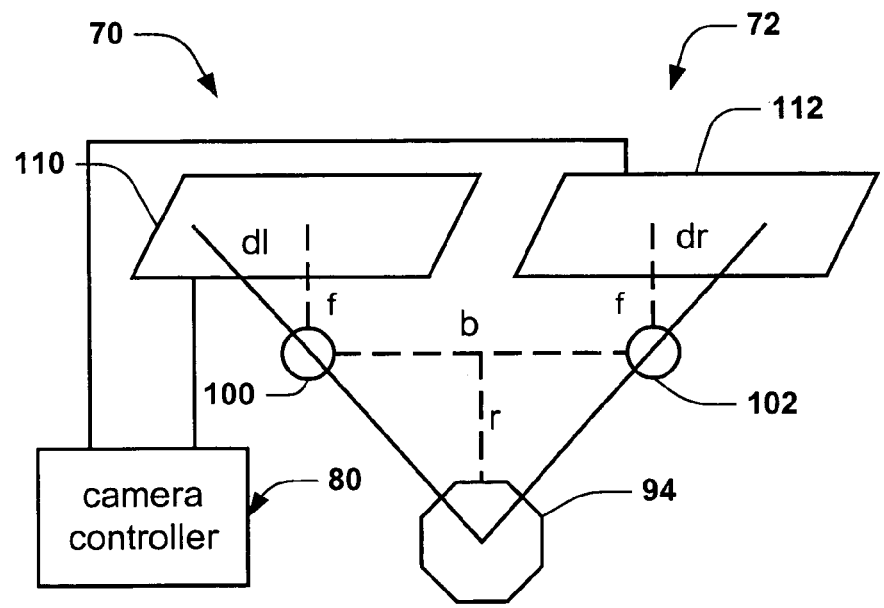
FIG. 2 is a schematic illustration of a stereo camera arrangement for use with the present invention for determining location of an occupant's head.

Referring to FIG. 2, the cameras 70, 72 may be of any several known types. In accordance with one exemplary embodiment, the cameras 70, 72 are charge-coupled devices ("CCD") or complementary metal-oxide semiconductor ("CMOS") devices. The output of the two devices can be combined to provide three-dimension information about an imaged subject 94 as a stereo disparity map. Since the cameras are at different viewpoints, each camera sees the subject at an associated different position. The image difference is referred to as "disparity." To get a proper disparity determination, it is desirable for the cameras to be positioned and set up so that the subject 94 to be monitored is within the horopter of the cameras.

The subject 94 is viewed by the two cameras 70, 72. Since the cameras 70, 72 view the subject 94 from different viewpoints, two different images are formed on the associated pixel arrays 110, 112, of cameras 70, 72 respectively. The distance between the viewpoints or camera lenses 100, 102 is designated "b." The focal length of the lenses 100 and 102 of the cameras 70 and 72 respectively, is designated as "f." The horizontal distance from the image center on the CCD or CMOS pixel array 110 and a given pixel representing a portion of the subject 94 on the pixel array 110 of camera 70 is designated "dl" (for the left image distance). The horizontal distance from the image center on the CCD or CMOS pixel array 112 and a given pixel representing a portion of the subject 94 on the pixel array 112 for the camera 72 is designated "dr" (for the right image distance). Preferably, the cameras 70, 72 are mounted so that they are in the same image plane. The difference between dl and dr is referred to as the image disparity. The analysis can be performed pixel by pixel for the two pixel arrays 110, 112 to generate a stereo disparity map of the imaged subject 94, wherein a given point on the subject 94 can be represented by x and y coordinates associated with the pixel arrays and an associated disparity value.

Figures 3, 4:
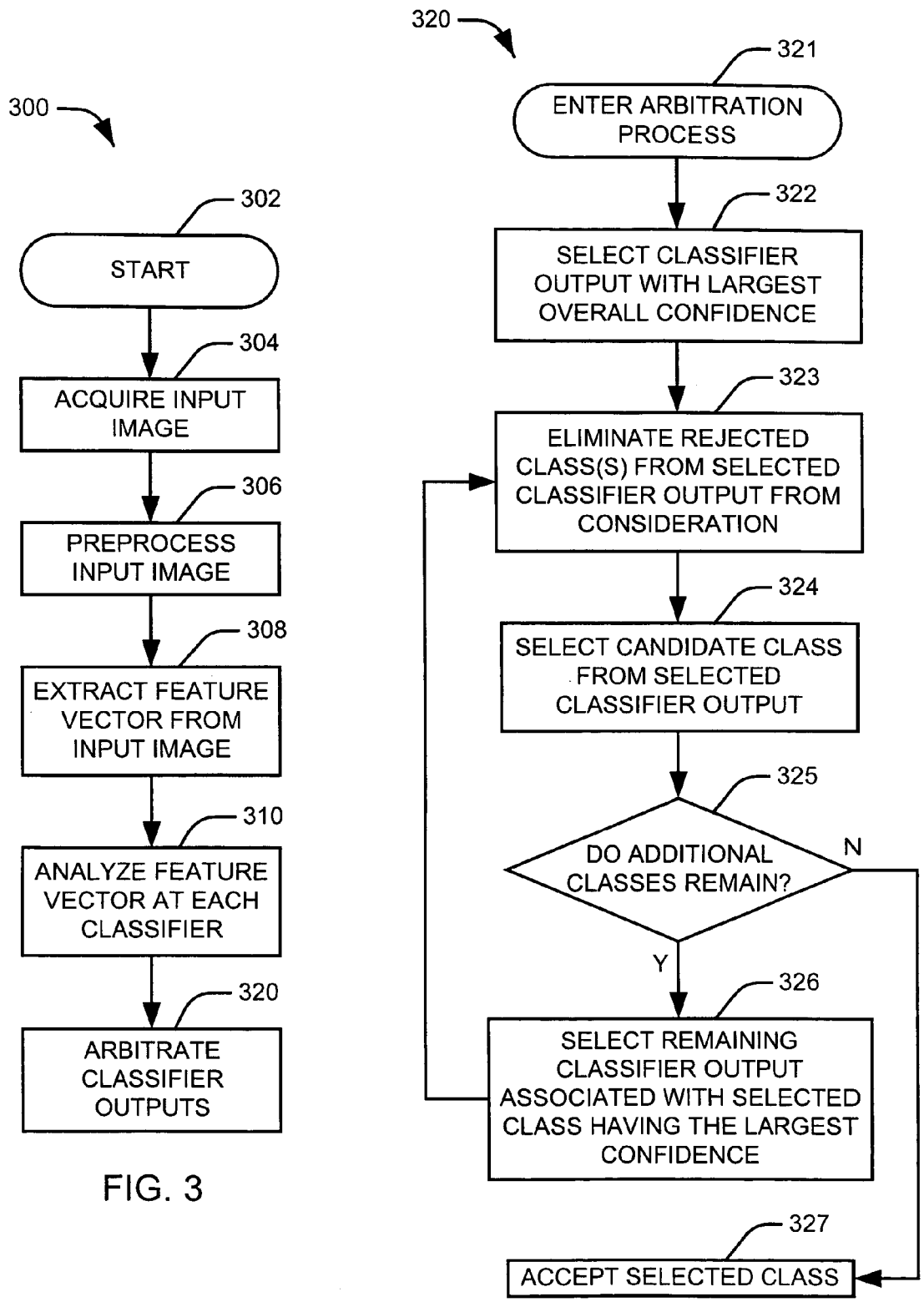
FIG. 3 is a flow chart showing a classification process in accordance with an exemplary embodiment of the present invention.
FIG. 4 is a flow chart showing an arbitration process in accordance with an exemplary embodiment of the present invention.

Referring to FIG. 3, a classification process 300, in accordance with one exemplary embodiment of the present invention, is shown. The illustrated process can, for example, be employed within the pattern recognition classification network 54. The illustrated process 300 determines an associated output class for an input image from a plurality of output classes. Although serial processing is shown, the flow chart is given for explanation purposes only and the order of the steps and the type of processing can vary from that shown.

The classification process is initialized at step 302, in which internal memories are cleared, initial flag conditions are set, etc. At step 304, an input image is acquired. For example, the input image can be a two or three-dimension image of the interior of the vehicle 26 acquired by the cameras 70, 72. For two-dimensional applications, the image can be acquired by either of the cameras 70, 72 using known digital imaging techniques.

Three-dimensional image data can be provided via the cameras 70, 72 as a stereo disparity map. The Otsu algorithm [Nobuyuki Otsu, "A Threshold Selection Method from Gray-Level Histograms," IEEE Transactions on Systems, Man, and Cybernetics, Vol. 9, No. 1, pp. 62-66, 1979] can be used to obtain a binary image of an object with the assumption that a given subject of interest is close to the camera system. The stereo images are processed in pairs and the disparity map is calculated to derive 3D information about the image.

The acquired image is preprocessed in step 306 to remove background information and noise. The image can also be processed to better emphasize desired image features and maximize the contrast between structures in the image. For example, a contrast limited adaptive histogram equalization (CLAHE) process can be applied to adjust the image for lighting conditions based on an adaptive equalization algorithm. The CLAHE process lessens the influence of saturation resulting from direct sunlight and low contrast dark regions caused by insufficient lighting. The CLAHE process subdivides the image into contextual regions and applies a histogram-based equalization to each region. The equalization process distributes the grayscale values in each region across a wider range to accentuate the contrast between structures within the region. This can make otherwise hidden features of the image more visible.

At step 308, feature data is extracted from the input image in the form of a feature vector. A feature vector represents an image as a plurality of elements representing features of interest within the image. Each element can assume a value corresponding to a quantifiable image feature. It will be appreciated the image features can include any quantifiable features associated with the image that are useful in distinguishing among the plurality of output classes. Exemplary features can include the average brightness within one or more selected regions of the image, the variance of the grayscale values of the pixels comprising one or more selected regions within the image, and a coarseness measure of one or more selected regions of the image.

Once the image has been reduced to a feature vector, it is provided to a plurality of pattern recognition classifiers for evaluation at step 310. Each classifier represents an associated subset of the plurality of output classes associated with the classification network. It will be appreciated that the subsets associated with the plurality of classifiers can overlap, such that a given class is represented in the subsets of multiple classifiers.

A given classifier selects an output class for the input image from its associated subset of output classes. This is referred to hereinafter as the candidate output class for the classification. The one or more remaining output classes from the classification are referred to as the rejected class or classes for the classification. The classifier can be trained on a plurality of training images to allow it to discriminate among its associated plurality of output classes. A confidence value representing the likelihood that the input image is a member of the candidate class can be determined from the feature vector and data extracted from the training images.

For example, a pattern recognition classifier implemented as a support vector machine can process data extracted from associated training images to produce functions representing boundaries in a feature space defined by the various features of interest. The bounded region for each class defines a range of feature values associated with each of the plurality of classes. The location of the feature vector representing the input image with respect to these boundaries can be used to determine the class membership of the input image and the associated confidence value.

At step 320, the confidence values associated with the classes selected at each classifier are evaluated according to an arbitration process to determine to which of the plurality of selected candidate classes the input image is most likely to belong. The arbitration process is managed dynamically to allow the classifiers having the largest confidence value to have the greatest influence on the arbitration process.

The arbitration process 320 will be appreciated with respect to FIG. 4. The illustrated arbitration process operates to select an associated class for an input image from a plurality of candidate output classes associated with a classification network (e.g., 54) based on the output of a plurality of pattern recognition classifiers. Although serial processing is shown, the flow chart is given for explanation purposes only and the order of the steps and the type of processing can vary from that shown.

The arbitration algorithm is initialized and provided with associated classes and classification confidence values from a plurality of pattern recognition classifiers in step 321. Each classifier is associated with a subset of the plurality of output classes. These subsets can overlap, such that multiple classifiers can be associated with the same output class. Each classifier selects a candidate class from its associated subset and generates a confidence value representing the likelihood that the selected candidate class is the class associated with the input image. The remaining one or more classes at each classifier are referred to as the rejected classes at the classifier. It will be appreciated that a given output class can be a candidate class at one classifier and a rejected class at a second classifier.

At step 322, the classifier having the best associated classification confidence value is selected. It will further be appreciated that by "best" confidence value, it is meant the value indicating the greatest confidence in the classifier determination. For example, if the classifiers are using an error measurement, the classifier having the lowest associated error have will have the best confidence value. Other classifiers generate a value that increases with the confidence of the classification. For certain classifiers, such as two-class, or binary, classifiers can have signed confidence values in which the sign indicates the selected output class and the magnitude (i.e., distance from zero) indicates the confidence of the classification. In such a case, the classifier having an associated confidence value with the greatest magnitude will be selected.

At step 323, the one or more rejected classes from the selected classification are removed from consideration. For example, the output of any classifier having the rejected class as one of its associated subset of classes can be ignored. Alternatively, the output of any classifier having the rejected class as its associated candidate class can be ignored. It will be appreciated that the methodology for eliminating rejected classes will vary with the number of classifiers and the number of output classes evaluated at each classifier.

At step 324, the candidate class from the selected classifier is selected. At step 325, it is determined if any output classes remain (i.e., have not been eliminated as rejected classes) other than the selected class. If so, the process advances to step 326, where a subset of remaining classifiers associated with the selected class is determined. For example, every classifier having the selected class within its subset of associated classes that has not already been removed from consideration can be selected. From the determined subset, a new classifier is selected as having the best confidence value within the subset. The method then returns to step 323 to evaluate the selected classifier output. If no other classes remain, the selected class is accepted as the output of the classification network 54 at step 327.

Figure 5:
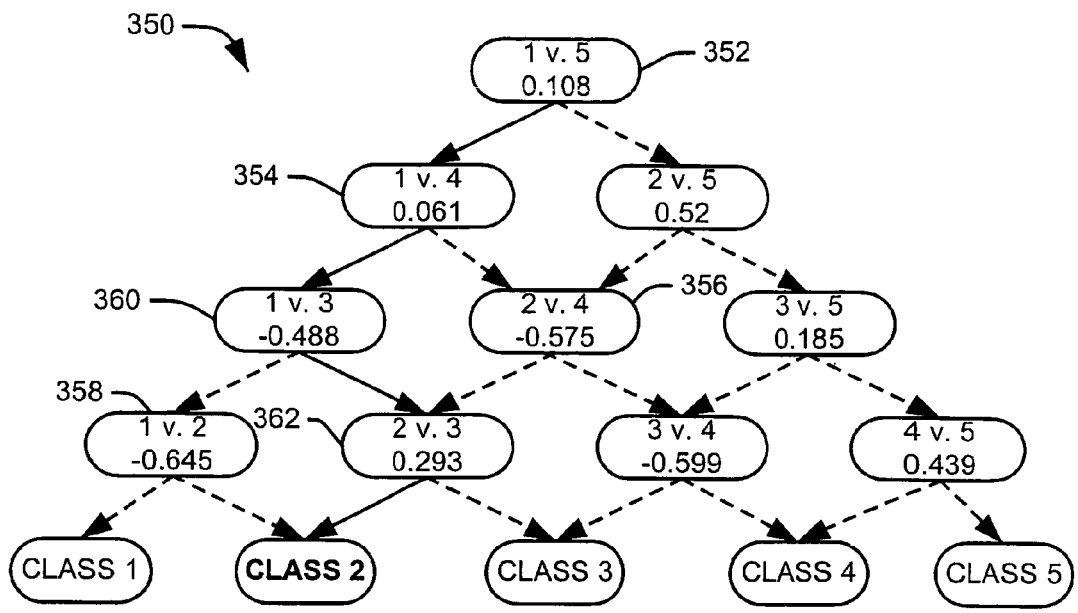
FIG. 5 is a schematic illustration of a directed acyclic graph arbitration process, known in the general field of pattern recognition, conducted on an example body of classifier data.

Several arbitration schemes for support vector machines and other pattern recognition applications are known in the general field of pattern recognition. FIG. 5 illustrates a directed acyclic graph ("DAG") arbitration system 350 used for arbitration in the field of support vector machines. This DAG type arbitration scheme is illustrated to contrast its arbitration result against a result using an arbitration scheme in accordance with the present invention. The confidence values used in the examples were selected for explanation purposes only. The illustrated DAG arbitration system shown in FIG. 5, if applied to a vision system of the type described, could be used to arbitrate among a plurality of pattern recognition classifiers. For the purpose of explanation, assume a DAG arbitrates among ten pattern recognition classifiers representing five output classes, labeled as class 1 through class 5.

In the illustrated example, each of the illustrated classifiers represents two output classes, a positive class and a negative class, with the positive class being listed first in each classification in the illustration. The confidence value generated by each classifier varies between negative one and positive one, with large positive confidences values indicating a strong likelihood that the positive class is associated with an input image, and large negative confidences values indicating a strong likelihood that the negative class is associated with an input image. Thus, the selected class is indicated by the sign of the confidence value and the confidence of the classification is indicated by the magnitude of the confidence value.

A first classification 352 discriminates between class 1 and class 5. Assume the first classifier 352 generates a relatively small positive confidence value. This indicates that the classifier has selected class 1, but with a relatively low confidence in the result. Since class 1 is selected, class 5 is eliminated and the arbitration process proceeds down the DAG to a second classification 354 that discriminates between class 1 and class 4. Assume the second classification 354 has an even smaller positive associated confidence value, indicating that while class 1 is also selected at this classification 354, that the classification confidence is quite low compared to other classifications available (e.g., 356 and 358) within the DAG that are associated with classes 1 and 4. On the basis of this classification, class 4 is eliminated, and the arbitration process then continues down the DAG to a third classification 360.

The third classification compares class 1 to class 3. Assume the third classification 360 has a large negative associated confidence value, indicating that class 3 is the class more likely to be associated with the input image. Class 1 is then eliminated from consideration, and the arbitration process references the fourth classification 362. The fourth classification 362 compares the last two remaining classes, class 2 and class 3. Assume the fourth classification 362 provides a positive result, indicating that class 2 is the class most likely to represent the input image.

As the above example illustrates, the class selection made at each classification controls the progress of the process through the DAG. As each class is rejected in a classification, it is eliminated from consideration, and the selected class is tested against a new class. An erroneous classification near the top of the DAG can thus skew the results regardless of the accuracy of subsequent classifications. The illustrated directed acyclic graph has a determined order, such that the first classification always compares the same two output classes and for a given set of class selections, always proceeds in the same order through the DAG regardless of the confidence values of the classifications. Thus, the initial class selections associated with the DAG can be made according to low confidence classifications, increasing the possibility of error within the classification system.

For example, in the illustrated system 350, class 1 is selected over class 4 on the basis of a single, low confidence classification result. This result would appear suspect in light of the fact that class 4 was selected over each of the remaining classes, including the selected class, class 2, with a high degree of confidence. Class 1, on the other hand, was rejected in favor of classes 2 and 3 with a high degree of confidence. This information is lost due to the static nature of the illustrated DAG arbitration system 350.

FIGS. 6A-6D illustrate the progression of an exemplary dynamic arbitration process in accordance with the present invention. The exemplary arbitration process, as illustrated, arbitrates among ten pattern recognition classifiers representing five output classes, labeled as class 1 through class 5. Each of the illustrated classifiers represents two output classes, a positive class and a negative class, with the positive class being listed first in each classification in the illustration. The confidence value generated by each classifier varies between negative one and positive one, with large positive confidences values indicating a strong likelihood that the positive class is associated with an input image, and large negative confidences values indicating a strong likelihood that the negative class is associated with an input image. Thus, the selected class is indicated by the sign of the confidence value and the confidence of the classification is indicated by the magnitude of the confidence value. For the purposes of comparison against a DAG arbitration scheme, the same confidence values are used as was used in FIG. 5.

Figure 6A:
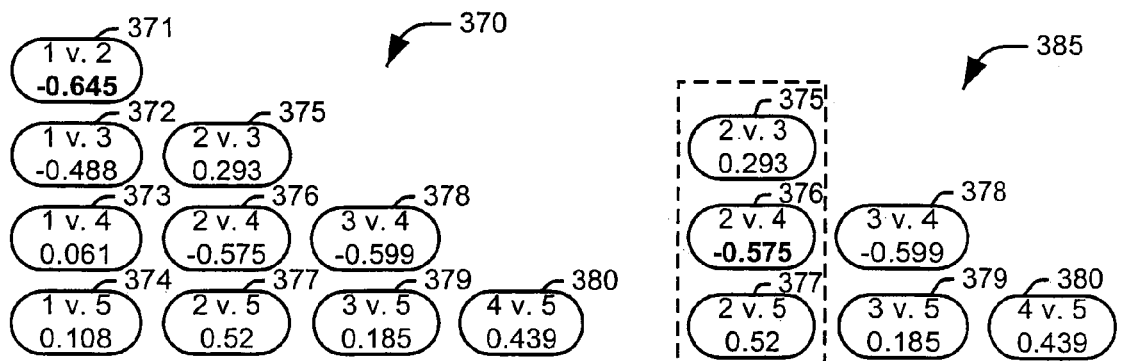
FIGS. 6A-6D provide a schematic illustration of an arbitration process in accordance with an exemplary embodiment of the present invention conducted on an example body of classifier data.

FIG. 6A illustrates a table 370 of ten classification results 371-380 associated with the ten classifiers representing a first step in the arbitration process. The arbitration process begins by selecting the classification 371 having the associated confidence value with the largest magnitude. The selected classification 371 selects between class 1 and class 2. Since the selected classification has a large negative confidence value, class 1, the positive class, is rejected and class 2, the negative class is selected as a candidate class. The rejected class, class 1, from the classification 371 is eliminated from the process.

Figure 6B:
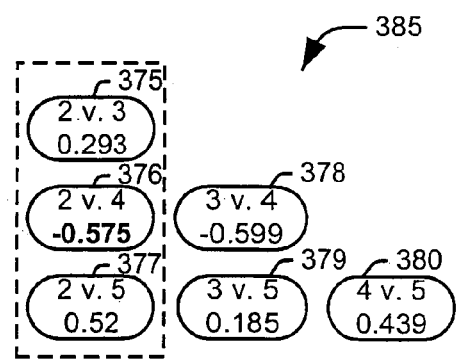

FIG. 6B illustrates a table 385 representing a second step in the arbitration process. In the second step, all of the classifications 371-374 associated with the rejected class, class 1, have been removed from consideration. A set of classifications 375-377 associated with the candidate class, class 2, is defined. The process selects a new classification 376 among the set of classifications 375-377 having a confidence value with the largest magnitude. The newly selected classification 376 selects between class 2 and class 4. Since the selected classification has a large negative confidence value, the negative class, class 4, is selected as the candidate class and the positive class, class 2 is rejected and eliminated from consideration.

Figure 6C:
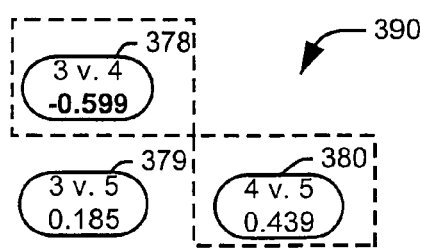

FIG. 6C illustrates a table 390 representing a third step in the arbitration process. In the second step, all of the classifications 375, 376, 377 associated with the rejected class, class 2, have been removed from consideration. A set of classifications 378, 380 associated with the candidate class, class 4, is defined. The process selects a new classification 378 among the set of classifications 378, 380 having a confidence value with the largest magnitude. The newly selected classification 378 selects between class 3 and class 4. Since the selected classification has a large negative confidence value, the negative class, class 4, is selected as the candidate class and the positive class, class 3 is rejected and eliminated from consideration.

Figure 6D:
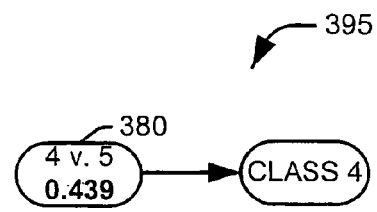

FIG. 6D illustrates a table 395 representing a fourth step in the arbitration process. In the third step, all of the classifications 378, 379 associated with the rejected class, class 3, have been removed from consideration. This leaves a final classification 380, which by default, is associated with the largest remaining confidence value. The newly selected classification 380 selects between class 4 and class 5. Since the selected classification has a positive confidence value, the negative class, class 5 is rejected and eliminated from consideration. This leaves only class 4, which is selected as the associated class for the input image.

It will be appreciated that the process illustrated in FIGS. 6A-6D utilizes the best available data, in the form of the classification with the largest confidence value, at each stage in the process, increasing the overall accuracy of the classification system. Accordingly, the results of the illustrated dynamic arbitration process are significantly more likely to be accurate than the static DAG system 350 illustrated in FIG. 5.

Figure 7:
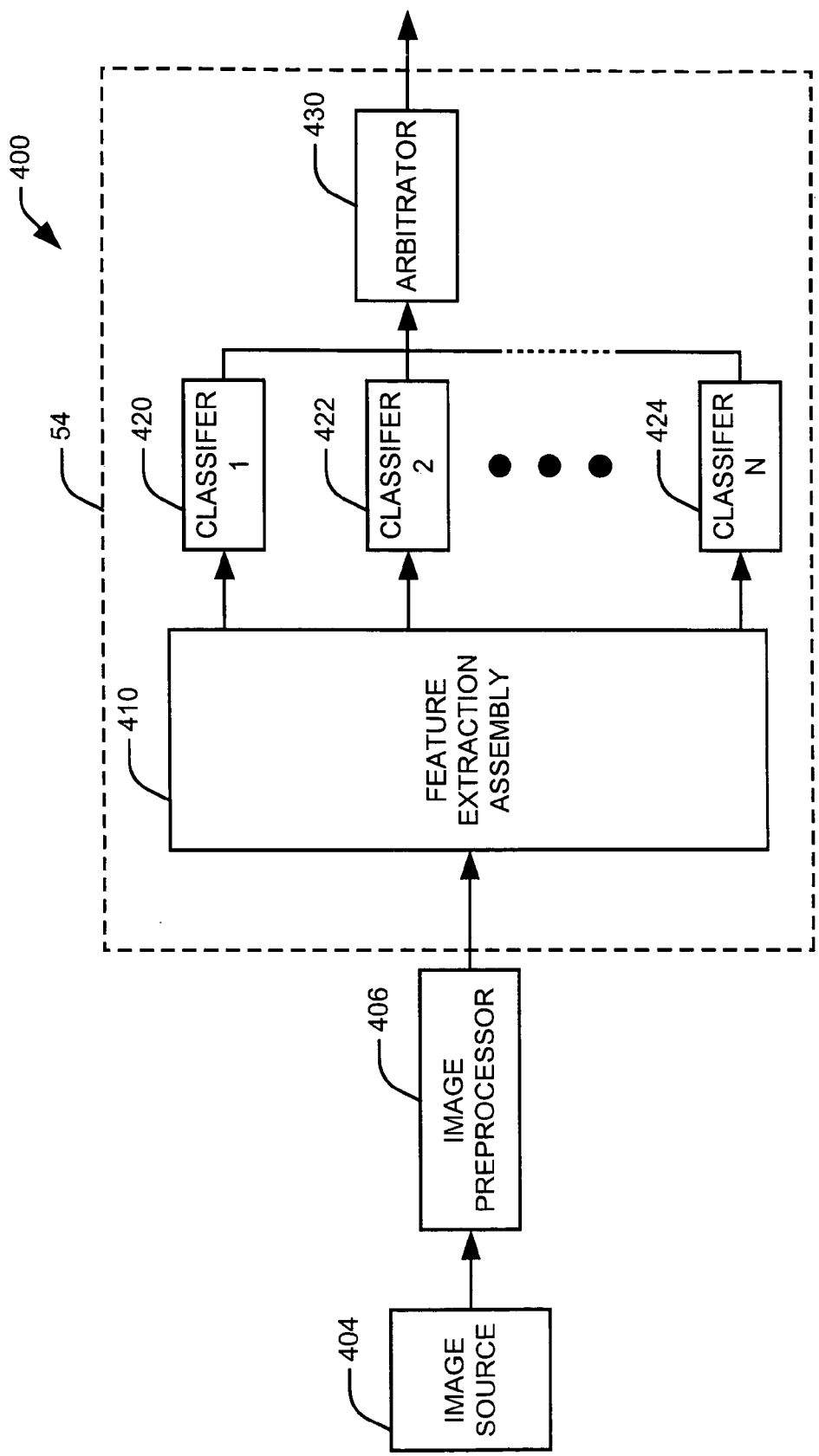
FIG. 7 is a diagram illustrating a classifier system incorporating an arbitration system in accordance with an exemplary embodiment of the present invention.

Referring to FIG. 7, a classification system 400 utilizing an arbitration system in accordance with an exemplary embodiment of the present invention can be utilized as part of the actuatable occupant restraint system 20 illustrated in FIG. 1. For example, a classifier network 54 can be used to determine an associated class from a plurality of classes (e.g., adult, child, rearward facing infant seat, etc.) for the occupant of a passenger seat of an automobile to control the deployment of an air bag associated with the seat. Similarly, the classifier network 54 can be used to facilitate the identification of an occupant's head by determining if a candidate object resembles a human head. It will be appreciated that the classification system 400 can be implemented, at least in part, as computer software operating on a general purpose computer.

An image source 404 acquires an input image from the vehicle interior. The image source 404, for example, can comprise one or more digital cameras that can produce a digital representation of a subject within the interior of the vehicle. In an exemplary embodiment, the image source can comprise a stereo camera, such as that illustrated in FIGS. 1 and 2. Accordingly, the input image can comprise a two-dimensional image, such as a grayscale image, or a three-dimensional image represented as stereo disparity map.

The input image is provided to a preprocessing component 406 to improve the resolution and visibility of the input image. For example, the image can be filtered to remove noise within the image and segmented to remove extraneous background information from the image. In an exemplary embodiment, a contrast limited adaptive histogram equalization can be applied to adjust the image for lighting conditions. The equalization eliminates saturated regions and dark regions caused by non-ideal lighting conditions. The image can be equalized at each of a plurality of determined low contrast regions to distribute a relatively narrow range of grayscale values within each region across a wider range of values. This can eliminate regions of limited contrast (e.g., regions of saturation or low illumination) and reveal otherwise indiscernible structures within the low contrast regions.

The preprocessed input image is then provided to the classification network 54 at a feature extraction assembly 410. The feature extraction assembly 410 extracts feature data representing the input image for a plurality of classifiers 420, 422, 424, where classifier 424 represents an $N^{th}$ classifier and N is an integer greater than one. The feature extraction assembly 410 extracts one or more quantifiable features from the input that are useful in distinguishing among the plurality of input classes.

The plurality of classifiers 420, 422, 424 can receive a common set of features from the feature extraction assembly 410, or the feature extraction assembly can provide feature sets specific to each classifier. The provided feature sets are provided as feature vectors, wherein each element of the feature vector has a value representing an associated feature. Exemplary features can include an average or variance measure of the color saturation of one or more selected portions of the image, a coarseness measure of the selected portions, an average or variance measure of the hue of the selected portions, and an average or variance of the brightness of the selected portions.

A given classifier (e.g., 420) processes the feature vector provided by the feature extraction assembly 410 to select a candidate class from an associated subset of output classes and provides a confidence value representing the likelihood that the input image is associated with the candidate class. For a vehicle safety system application, the output classes can represent potential occupants of a passenger seat, such as a child class, an adult class, a rearward facing infant seat class, an empty seat class, and similar useful classes. Similarly, the output classes can represent human heads and other shapes (e.g., headrests) resembling a human head for determining the position of an occupant.

In the illustrated implementation, each classifier compares an associated two of the plurality of output classes. Effectively, each classifier simply selects one of its two classes as a candidate class for the classification and the other as a rejected class. The classifier also outputs an associated confidence value representing the likelihood that the selected candidate class is the associated class for the input image. The number of classifiers is selected such that each output class is compared to every other output class. Accordingly, a total of $k(k-1)/2$ classifiers are utilized, where k is the desired number of output classes. It will be appreciated, however, that the classifiers 420, 422, 424 can be configured to have additional associated output classes.

The classifiers 420, 422, 424 can be implemented as any of a number of intelligent systems suitable for classifying an input image. In an exemplary embodiment, the classifier 54 can utilize one of a Support Vector Machine ("SVM") algorithm or an artificial neural network ("ANN") learning algorithm to classify the image into one of a plurality of output classes.

A SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provide the confidence values for the output classes of the ANN, with each node having an associated value representing a confidence for one of the associated output classes of the classifier.

The training process of the classifier 54 will vary with its implementation, but the training generally involves a statistical aggregation of training data from a plurality of training images into one or more parameters associated with the output class. For example, a SVM classifier can process the training data to produce functions representing boundaries in a feature space defined by the various attributes of interest. Similarly, an ANN classifier can process the training data to determine a set of interconnection weights corresponding to the interconnections between nodes in its associated the neural network.

An arbitrator 430 evaluates the outputs of the classifiers 420, 422, 424 to determine an output class for the input image. In the illustrated implementation, the arbitrator performs an iterative evaluation of the plurality of classifiers that selects the classification results according to their associated confidence values and eliminates the rejected classes from each selected classifier until a single class remains.

For example, the arbitrator can select a first classifier having a best associated confidence value among the plurality of classifiers. A best associated confidence value is a confidence value that indicates the highest level of confidence in a decision. In an exemplary implementation, the generated confidence values directly reflect a likelihood that the associated classification is correct, and the arbitrator can select the confidence value having the largest magnitude. The method of producing a confidence value can vary, however, for different methods of classification. For example, if the confidence values are expressed in terms of total error (e.g., distance from an ideal class member) or uncertainty, the best confidence value can be the confidence value having the lowest magnitude.

The class rejected at the selected classifier is removed from consideration in the arbitration process. In the illustrated implementation, all classifiers associated with the rejected class (e.g., having the rejected class as either their positive class or negative class) are eliminated from consideration. The arbitrator 430 defines a classifier set comprising the remaining classifiers, and a selection set comprising the remaining classifiers associated with the candidate class determined by the selected classifier. The arbitrator 430 then select a classifier from the selection set having the best confidence value. It will be appreciated that the newly selected classifier will not necessarily have the best confidence value among the remaining classifiers, but simply the best confidence value among the remaining classifiers associated with the candidate output class.

The process is then repeated with the newly selected classifier, with the rejected class from the selected classifier being removed from consideration and yet another classifier associated with the candidate output class of the selected classifier being selected. This will continue until only one classifier remains. At that point, the candidate output class of the remaining classifier is selected as the output of the classifier network 54.

From the above description of the invention, those skilled in the art will perceive improvements, changes, and modifications. Such improvements, changes, and modifications within the skill of the art are intended to be covered by the appended claims.

Having described the invention, the following is claimed:

1. A computer readable medium, storing computer executable instructions thereon for classifying an input image into one of a plurality of output classes comprising at least three classes, said executable instructions, when executed by a processor, performing the following process:
   determining a candidate output class, at least one rejected output class, and an associated confidence value from a set of associated output classes at each of a plurality of classifiers;
   selecting a classifier from the plurality of classifiers having a best confidence value;
   eliminating the at least one rejected class at the selected classifier from consideration as the associated class for the input image; and
   iteratively repeating the following steps until only one output class remains:
      defining a subset of classifiers associated with the candidate output class from the selected classifier;
      selecting a new classifier having the best associated confidence value within the defined subset; and
      eliminating the at least one rejected classes determined at the selected new classifier from consideration as the associated class for the input image.

2. A system for classifying image data associated with a vehicle occupant safety system into an associated one of a plurality of output classes, said system comprising:
   a camera that images a vehicle interior to provide an input image;
   a plurality of pattern recognition classifiers, each of the plurality of pattern recognition classifiers having associated first and second output classes from the plurality of output classes and being operative to select one of the first and second output classes as a candidate output class for the input image and the other of the first and second output classes as a rejected output class and generate a confidence value associated with the classifier based on the selection;
   an arbitrator that conducts an iterative process until only one of the plurality of pattern recognition classifiers, and its associated selected output class, remain, wherein at each iteration, the arbitrator selects a classifier having a best associated confidence value from a classifier set initially comprising the plurality of classifiers, determines the rejected class associated with the selected classifier, and removes each classifier within the classifier set having the rejected class as one of its associated first and second output classes, such that in the next iteration, the classifier set will include only classifiers that do not have the rejected class as one of its associated first and second output classes.

3. The system of claim 2, wherein the candidate class determined by the one remaining classifier is accepted as the output class associated with the input image, and the accepted class is provided as an input to the vehicle occupant safety system.

4. The system of claim 2 wherein at least one of the plurality of output classes represents a human adult seated within the vehicle interior.

5. The system of claim 2 wherein at least one of the plurality of output classes represents a rearward facing infant seat positioned within the vehicle interior.

6. The system of claim 2 wherein at least one of the plurality of output classes represents a human head.

7. The system of claim 2 wherein the vision system is operative to produce a two-dimensional image of the vehicle interior.

8. The system of claim 2 wherein the vision system is operative to produce a three-dimensional image of the vehicle interior.

9. The system of claim 8 wherein the vision system comprises a stereo camera that images the vehicle interior as a stereo disparity map.

10. A method for classifying an input image into an associated one of a plurality of output classes comprising the steps of:
   determining a candidate output class, at least one rejected output class, and an associated confidence value from a set of associated output classes at each of a plurality of classifiers;
   selecting a classifier from the plurality of classifiers having a best confidence value;
   eliminating the at least one rejected class at the selected classifier from consideration as the associated class for the input image; and
   iteratively repeating the following steps until only one output class remains:

defining a subset of classifiers associated with the candidate output class from the selected classifier;

selecting a new classifier having the best associated confidence value within the defined subset; and eliminating the at least one rejected classes determined at the selected new classifier from consideration as the associated class for the input image.

11. The method of claim 10 further comprising accepting the one remaining output class as the associated output class for the input image, and providing the accepted output class to a vehicle occupant safety system.

12. The method of claim 10 further comprising extracting feature data from the input image and providing the extracted feature data to the plurality of classifiers.

13. The method of claim 12 wherein extracting feature data from the input image includes extracting at least one feature value from at least one region of interest within the image.

14. The method of claim 12 wherein the at least one feature value includes an average grayscale value associated with each region of interest.

15. The method of claim 12 wherein the at least one feature value includes a coarseness measure associated with each region of interest.

16. The method of claim 12 wherein the at least one feature value includes a contrast measure associated with each region of interest.

* * * * *